Sept. 5, 1933.  J. FOTAKIS  1,925,631
AUTOMOBILE MIRROR SET
Filed Nov. 14, 1932
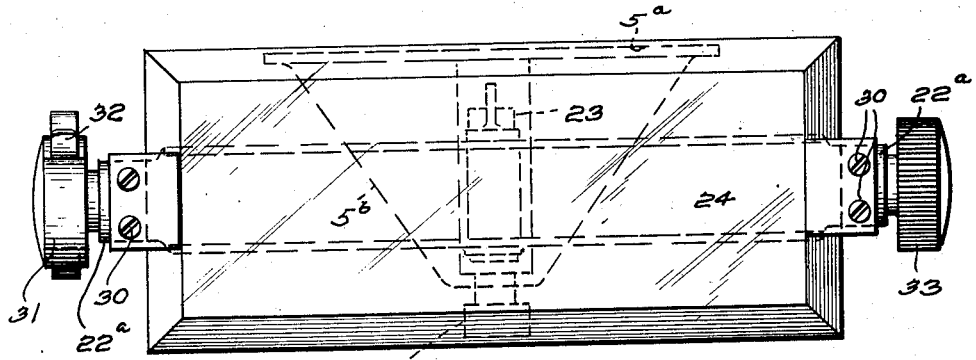
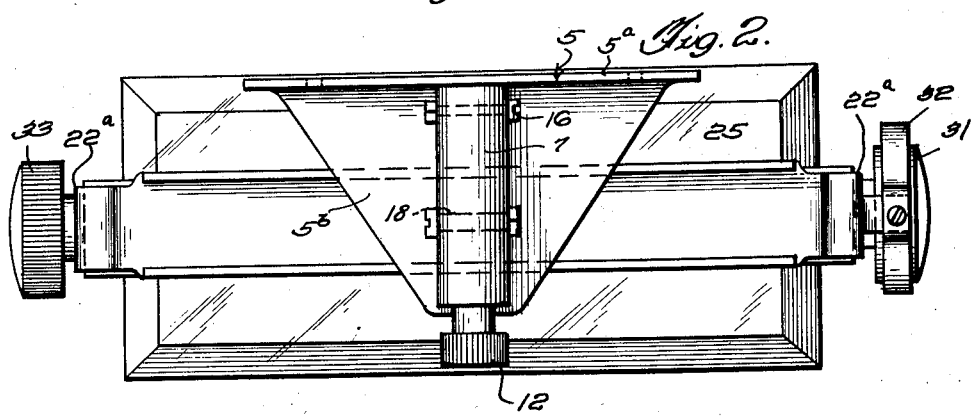
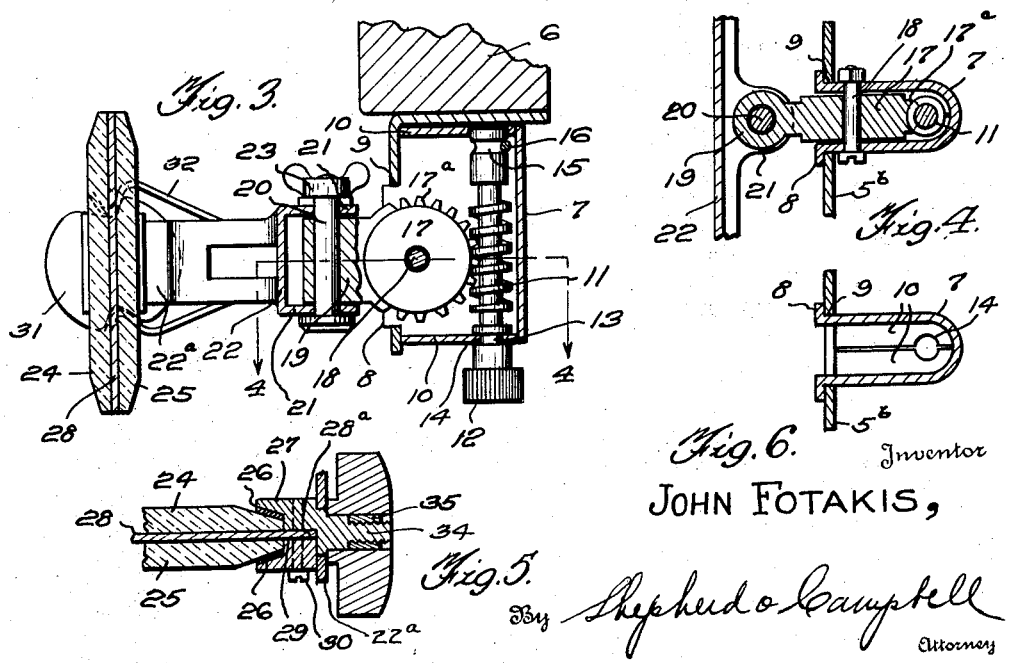
Inventor
JOHN FOTAKIS, Patented Sept. 5, 1933

1,925,631

UNITED STATES PATENT OFFICE 1,925,631

AUTOMOBILE MIRROR SET

John Fotakis, Washington, D. C.

Application November 14, 1932
Serial No. 642,663

12 Claims. (Cl. 45—97)

This invention relates to automobile mirror sets, and it has for its object to provide a new and improved construction of rear view mirror sets by means of which very accurate adjustment of the rear view mirrors may be effected and maintained, and by means of which either "light" or "dark" mirrors may be brought into position to function.

The device of the present invention relates to mirror sets of the character of those shown in my Patent No. 1,864,015, dated June 21, 1932 and in my copending application Serial No. 620,944, filed July 5, 1932.

The rear view mirrors first employed on automobiles comprised mirrors of ordinary construction, i. e., those having highly reflective backings. While such mirrors were very efficient in daylight driving, they were objectionable for night driving, because they reflected into the eyes of the driver, with full force, the rays from the headlights of following automobiles. To cure the foregoing defect, rear view mirrors have recently been proposed, and are now largely used, having backings of a dark or black material. These latter mirrors are found to very materially cut down the glare from the headlights of following automobiles, while they still yield a fair service as reflecting mediums, in daylight. Therefore, like my patent aforesaid, the structure of the present invention employes the two mirrors; one having a highly reflective backing and the other having a dark backing; the two being mounted to be reversible to bring either of them into action and the mounting being adjustable in both the vertical and horizontal planes through the medium of an adjusting means which is accessible for positive setting without destroying the initial adjustment of the mirror that is being used. That is to say, the mounting is bodily shiftable in a horizontal plane and adapted to be held in such horizontally shifted position by means of a binding nut, and is adjustable in a vertical plane by means of a screw adapted to give a very fine and accurate adjustment of the mounting. After the position in a horizontal plane has once been determined, this position need not be frequently altered. However, the positioning in a vertical plane needs to be altered relatively frequently or as often as short or tall persons interchangeably use the driver's seat. The device of the present invention is operable to accurately shift the positioning of the device in a vertical plane without disturbing the previously set adjustment in a horizontal plane.

In the accompanying drawing:

Figure 1 is a front elevation of a structure constructed in accordance with the invention.

Figure 2 is a rear elevation thereof.

Figure 3 is a central transverse vertical sectional view.

Figure 4 is a horizontal sectional view on line 4—4 of Figure 3.

Figure 5 is a horizontal sectional view through one of the trunnions.

Figure 6 is a detailed sectional view like Figure 4 but showing only the housing.

Like numerals designate corresponding parts in all the figures of the drawing.

Referring to the drawing, 5 designates a substantially L-shaped bracket having a horizontal portion 5a and a vertical front face 5b. The horizontal portion of this bracket is adapted to be secured to the forward top frame member 6 of an automobile. A housing extension 7, preferably stamped from sheet metal, is secured to the rear face of the bracket 5 by ears which pass through an opening 9 formed in the vertical wall 5b of the bracket and are outturned upon the opposite side of said wall. The housing 7 may be further secured to the vertical wall 5b of the bracket by brazing, soldering or welding the ears 8 to said wall. The upper and lower portions of the housing 7 are preferably closed by the inturned portions 10 of said housing.

An adjusting screw 11 is journaled in the housing 8 and has a knurled head 12 at its lower end by which it may be turned. A bearing portion 13 of this screw is engaged in the opening 14 of the housing and at its upper end said screw is provided with an annular groove 15 that is traversed by a screw 16, said screw 16 serving to prevent endwise movement of the adjusting screw 11. The spiral thread of screw 11 engages teeth 17a formed upon a segmental disk 17; the latter being journaled upon a transverse screw or pivot 18 which passes through and is supported in the walls of the housing 7.

A forwardly extending block 19 carried by the segmental disk 17 is traversed by a pivot pin 20. This block fits between ears 21 of a bracket 22. The pivot pin 20 traverses said ears as well as block 19 and serves to pivot bracket 22 with respect to said block 19. A thumb nut 23 upon the upper end of the pivot pin 20 serves as a binding means for adjusting the position of bracket 22 with respect to the bracket 5 in a horizontal plane and about the vertical axes constituted by pivot pin 20. The angle of the bracket 22, and consequently of the mirrors carried thereby, may be adjusted about the horizontal axes constituted by pivot 18 by the manipulation of the adjusting screw 11; it being apparent that as said screw is turned through the medium of head 12, segmental disk 17 will be turned about its pivot 18, and block 19 will be rocked upwardly or downwardly as the case may be, carrying bodily with it the horizontal adjusting means of bracket 22.

Consequently, after this horizontal adjusting means of bracket 22 is once set, vertical adjustment of the mirrors does not require any manipulation or resetting of the horizontal adjustment.

The means for mounting the light and dark mirrors, indicated at 24 and 25, are substantially the same as those shown in my copending application Serial No. 620,944 except that I am able, by reason of the provision of frictional binding means for the ends of the mirrors, to facilitate the mounting of the mirrors with respect to their trunnions. This improvement resides in having strips of rubber 26 between the trunnion blocks 27 and the bevelled end portions of the mirrors 24 and 25.

While I have referred to the use of rubber, it is to be understood that I may employ felt, cork, or any other material which will have such a frictional grip upon glass as to sufficiently hold the mirrors against movement with respect to the central plate 28 which spaces the mirrors from each other and serves as a carrier for said mirrors. This plate is of substantially the same area as the rear face of the mirrors and is provided with reduced end portions 28a which enter slots 29 formed in the trunnion blocks 27. Binding screws 30 serve to bind these split trunnion blocks upon the ends of the mirrors 24 and 25 bringing the rubber or other frictional gripping strips into such tight engagement with the mirrors as to hold said mirrors into secure engagement with said trunnion blocks without the necessity of providing any means upon plate 28 for engaging the upper and lower edges of the mirrors.

This is of importance from a manufacturing standpoint because the use of supporting ears upon the upper and lower edges of the plate 28 necessitates the cutting of the mirrors to very exact dimensions and also frequently results in chipping the edges of said mirrors.

Like my application above referred to, the trunnion block at one end of the frame 22 carries a notched disk 31 adapted to be engaged by spring pawls 32; said notched disk serving to bring the mirrors to a postion of rest at such point as will result in the mirrors being held in upright or visual position. The trunnion at the opposite end of the mirrors is provided with a thumb piece 33 by which adjustment of the mirrors may be effected; it being understood that the thumb piece 33 serves as a turning medium for the mirrors while the notched disk 31 and its pawls serve to bring the mirrors to a position of rest at the proper point.

The trunnions are provided with reduced and threaded extensions 34, said extensions in turn being engaged by lock nuts 35 which hold the ratchet disk 31 or the thumb piece 33, as the case may be, in properly adjusted position upon said reduced threaded extensions of the trunnion blocks so that there will be no binding of the end members 22a of the bracket between the trunnion blocks and the adjacent ratchet disk 31 or thumb piece 33.

While I have described the invention as comprising a pair of light and dark mirrors, it will be clear that the minutely adjustable manipulating means is of utility in the manipulation of single rear view mirrors as well as in the manipulation of double mirrors, and I wish it to be understood that the invention contemplates such use.

It is to be understood that the invention is not limited to the precise construction set forth, but that it includes within its purview whatever changes fairly come within either the terms or the spirit of the appended claims.

Having described my invention, what I claim is:

1. The combination of a pair of light and dark mirrors, of a supporting bracket in which said mirrors are trunnioned at their ends for tilting, a member upon which said supporting bracket is pivoted for adjustment about a vertical axis, and a manually operable adjusting screw engaging said member to adjust it minutely in a vertical plane and about a horizontal axis.

2. The combination of a rear view mirror of an elongated U-shaped frame in which said mirror is trunnioned at its ends for tilting about a horizontal axis, a member upon which said supporting frame is mounted for adjustment about a vertical pivot, means carried by said pivot for frictionally binding said frame in adjusted position, and an adjusting screw engaging said member and adjusting it bodily and minutely in a vertical plane.

3. The combination with a supporting frame, a rear view mirror trunnioned thereon for tilting about a horizontal axis a toothed member upon which said supporting frame is pivoted for movement about a vertical axis, means for binding said frame in an adjusted position upon said member, means for pivoting said member to rock in a vertical plane and about a horizontal axis, and an adjusting screw engaging the teeth of said member for rocking said member about its pivot.

4. A device of the character described comprising a rear view mirror, a bracket in which said mirror is trunnioned, a member upon which said bracket is pivoted for adjustment about a substantially vertical axis, means for binding said bracket in such adjusted position, a housing in which said member is mounted to turn about a horizontal pivot, a supporting bracket by which said housing is carried, and an adjusting screw journaled in said housing.

5. A device of the character described comprising a supporting bracket consisting of a horizontal top wall and vertical front wall, said front wall having an opening formed therethrough a housing located beneath the top wall and having extensions which pass through the opening of the front wall and are bent over said front wall, a toothed segment disposed in said housing and pivoted for turning movement about a substantially horizontal axis and comprising a forwardly extending block, a bracket provided with ears engaging said block and pivoted thereon for swinging movement about a vertical axis, a pair of light and dark mirrors trunnioned in said bracket, and means for adjusting said toothed segment about its pivot.

6. A structure as recited in claim 5 wherein the means for adjusting the toothed segment about its pivot comprises a manually operable screw.

7. A device of the character described comprising a supporting bracket having a vertical front wall portion, a housing carried by said bracket rearwardly of said wall portion, a toothed segment pivoted in said housing and carrying a block which projects forwardly from beyond the front wall of said bracket, a screw journaled in the housing and engaging the teeth of said segment, a horizontally disposed U-shaped bracket, a rear view mirror trunnioned therein, ears carried by the U-shaped bracket, means for pivoting said ears to said block, and a binding means associated with said pivot.

8. A device of the character described comprising a rear view mirror, a bracket by which said mirror is carried, a toothed member upon which said bracket is pivoted for adjustment about a substantially vertical axis, means for mounting said member for rocking about a substantially horizontal axis, and a screw engaging the teeth of said member for effecting such rocking movement thereof.

9. A device of the character described comprising a rear view mirror, a bracket in which said mirror is trunnioned at a point substantially intermediate the height of the mirror, a thumb piece for rocking said mirror upon its trunnions, a member mounted to rock about a substantially horizontal axis, means for mounting said bracket upon said member to rock about a substantially vertical axis disposed in advance of the horizontal axis, and a manually operable adjusting element engaging said member to effect adjustment thereof about said horizontal axis.

10. A structure as recited in claim 9 wherein said manually operable element consists of a rotatable screw and the said member carries rack teeth with which said screw engages.

11. A device of the character described comprising a pair of light and dark mirrors disposed back to back, a substantially U-shaped bracket in which said mirrors are trunnioned at a point substantially intermediate their height, a thumbpiece engaged with one of said trunnions for tilting the mirrors about the axis defined by said trunnions, a member made to rock about a substantially horizontal axis and carrying a vertical pivot disposed in advance of the said horizontal axis and upon which vertical pivot the said U-shaped bracket is mounted for movement in a substantially horizontal plane, and a manually operable adjusting element engaging said member to effect adjustment thereof by rocking the same bodily about said horizontal axis.

12. A structure as recited in claim 11 wherein the manually operable adjusting element comprises a rotative screw and wherein said member is provided with teeth engaged by said screw.

JOHN FOTAKIS.